(12) United States Patent
McGrath et al.

(10) Patent No.: US 9,009,704 B2
(45) Date of Patent: Apr. 14, 2015

(54) APPLICATION PARTITIONING IN A MULTI-TENANT PLATFORM-AS-A-SERVICE ENVIRONMENT IN A CLOUD COMPUTING SYSTEM

(75) Inventors: Michael P. McGrath, Schaumburg, IL (US); Matthew Hicks, Westford, MA (US); Thomas Wiest, Lehi, UT (US); Daniel C. McPherson, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 377 days.

(21) Appl. No.: 13/606,063

(22) Filed: Sep. 7, 2012

(65) Prior Publication Data
US 2014/0075432 A1 Mar. 13, 2014

(51) Int. Cl.
G06F 9/455 (2006.01)
G06F 9/46 (2006.01)

(52) U.S. Cl.
CPC ...... *G06F 9/455* (2013.01); *G06F 2009/45587* (2013.01)

(58) Field of Classification Search
CPC .............. G06F 9/45533; G06F 9/5077; G06F 9/45537; G06F 9/52; G06F 9/5016; G06F 9/4881; G06F 9/4843
See application file for complete search history.

(56) References Cited

U.S. PATENT DOCUMENTS

| 8,424,059 | B2 * | 4/2013 | Kwok et al. | 726/3 |
|---|---|---|---|---|
| 8,429,659 | B2 * | 4/2013 | Bartfai-Walcott et al. | 718/103 |
| 8,484,639 | B2 * | 7/2013 | Huang et al. | 718/1 |
| 8,484,654 | B2 * | 7/2013 | Graham et al. | 718/104 |
| 8,601,483 | B2 * | 12/2013 | He et al. | 718/104 |
| 8,635,351 | B2 * | 1/2014 | Astete et al. | 709/229 |
| 8,706,772 | B2 * | 4/2014 | Hartig et al. | 707/803 |
| 8,707,322 | B2 * | 4/2014 | Graham et al. | 718/104 |
| 8,769,531 | B2 * | 7/2014 | Anderson et al. | 718/1 |
| 8,826,274 | B2 * | 9/2014 | Moriki et al. | 718/1 |
| 8,839,263 | B2 * | 9/2014 | Sugai | 718/105 |
| 8,843,924 | B2 * | 9/2014 | Dow et al. | 718/1 |
| 8,850,432 | B2 * | 9/2014 | McGrath et al. | 718/1 |
| 8,850,514 | B2 * | 9/2014 | McGrath et al. | 726/1 |
| 2010/0138830 | A1 * | 6/2010 | Astete et al. | 718/1 |
| 2011/0239215 | A1 * | 9/2011 | Sugai | 718/1 |
| 2011/0252420 | A1 * | 10/2011 | Tung et al. | 718/1 |
| 2011/0258621 | A1 * | 10/2011 | Kern | 718/1 |
| 2011/0276584 | A1 * | 11/2011 | Cotner et al. | 707/769 |

(Continued)

OTHER PUBLICATIONS

Planky "Cloud Virtual Networks: PaaS and IaaS approaches", pp. 1.2.*

*Primary Examiner* — Van Nguyen
(74) *Attorney, Agent, or Firm* — Lowenstein Sandler LLP (57) ABSTRACT

A mechanism for application partitioning in a multi-tenant PaaS environment in a cloud computing system is disclosed. A method of embodiments includes receiving, by a virtual machine (VM), a request to initialize a container on the VM, the container comprising a resource-constrained space of the VM to execute functionality of an application of a multi-tenant PaaS system. The method also includes assigning a user identification (UID) and non-volatile resources to the container, wherein the UID and non-volatile resources are part of a subset of UIDs and a subset of non-volatile resources allotted to the VM from a range of UIDs and a range of non-volatile resources associated with a district of the VM, and wherein other VMs in the district are not allotted the same subset of UIDs from the range of UIDs or the same subset of non-volatile resources from the range of non-volatile resources.

20 Claims, 8 Drawing Sheets

(56) References Cited

U.S. PATENT DOCUMENTS

| | | | |
|---|---|---|---|
| 2011/0302415 A1* | 12/2011 | Ahmad et al. | 713/168 |
| 2013/0227560 A1* | 8/2013 | McGrath et al. | 718/1 |
| 2013/0227561 A1* | 8/2013 | Walsh et al. | 718/1 |
| 2013/0227563 A1* | 8/2013 | McGrath | 718/1 |
| 2013/0227635 A1* | 8/2013 | Walsh et al. | 726/1 |
| 2013/0297672 A1* | 11/2013 | McGrath et al. | 709/202 |
| 2013/0297673 A1* | 11/2013 | McGrath et al. | 709/203 |
| 2013/0297795 A1* | 11/2013 | McGrath et al. | 709/226 |
| 2013/0326506 A1* | 12/2013 | McGrath et al. | 718/1 |
| 2014/0068611 A1* | 3/2014 | McGrath et al. | 718/1 |

* cited by examiner

Generate a unique Security Category Label (SCL) for each unique local user ID (UID) maintained by a node of a PaaS system
710

---

▼

---

For each unique UID, associate SCL for the UID to one or more IP addresses mapped to the UID and to one or more ports mapped to the UID
720

---

▼

---

Receive request to initialize a new container on the node
730

---

▼

---

Assign one of the unique UIDs to the container
740

---

▼

---

Label files in home directory of the UID assigned to the container with the SCL label of the UID
750

---

▼

---

When container starts execution, assign SCL of UID of container to running process(es) of the container
760

APPLICATION PARTITIONING IN A MULTI-TENANT PLATFORM-AS-A-SERVICE ENVIRONMENT IN A CLOUD COMPUTING SYSTEM

TECHNICAL FIELD

The embodiments of the invention relate generally to platform-as-a-service (PaaS) environments and, more specifically, relate to a mechanism for application partitioning in a multi-tenant PaaS environment in a cloud computing system.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system. Customers that have installed and are executing their programs "in the cloud" typically communicate with the executing program from remote geographic locations using Internet protocols.

For programs that are web applications, the additional software can further include such software components as middleware and a framework. Web applications are programs that receive and act on requests in web or other Internet protocols, such as HTTP. It is common for a user to use a web application by using a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically identifies all of the software components that a web application needs in order to execute, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested to execute the web application instead or in addition on a different hypervisor and/or in a different particular provider's cloud. Also, it can be difficult to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings. PaaS offerings typically facilitate deployment of applications without the cost and complexity of buying and managing the underlying hardware and software and provisioning hosting capabilities, providing all of the facilities required to support the complete life cycle of building and delivering web application and service entirely available from the Internet. Typically, these facilities operate as one or more virtual machines (VMs) running on top of a hypervisor in a host server.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for application partitioning in a multi-tenant Platform-as-a-Service (PaaS) environment in a cloud computing system. A method of embodiments of the invention includes receiving, by a virtual machine (VM), a request to initialize a container on the VM, the container comprising a resource-constrained space of the VM to execute functionality of an application of a multi-tenant PaaS system. The method also includes assigning a user identification (UID) and non-volatile resources to the container, wherein the UID and non-volatile resources are part of a subset of UIDs and a subset of non-volatile resources allotted to the VM from a range of UIDs and a range of non-volatile resources associated with a district of the VM, and wherein other VMs in the district are not allotted the same subset of UIDs from the range of UIDs or the same subset of non-volatile resources from the range of non-volatile resources.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing", "applying", "identifying", "configuring", "establishing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for application partitioning in a multi-tenant PaaS environment in a cloud computing system. In the multi-tenant PaaS environment, a node (i.e., virtual machine (VM)) in the PaaS environment runs multiple applications, and, as such, shares its resources between these applications. To enable this resource sharing, the applications may be partitioned over multiple nodes in the PaaS system.

An application in a multi-tenant PaaS system of embodiments may utilize several cartridges to provide the functionality of the application. These cartridges are run in containers, which are a resource-constrained process space within a node. Accordingly, an application may be executed utilizing multiple containers spread among multiple nodes of the PaaS system. In some embodiments, nodes in a PaaS system are assigned to a district. Each district is assigned a set of resources (e.g., user identifications (UIDs), security labels, IP addresses, ports, etc.) that are unique within the district and distributed to the containers within a district. As a result, migration of containers of an application within a district, but between VMs, can be accomplished without creating security labeling conflicts or other resources conflicts for the container.

Figure 1:
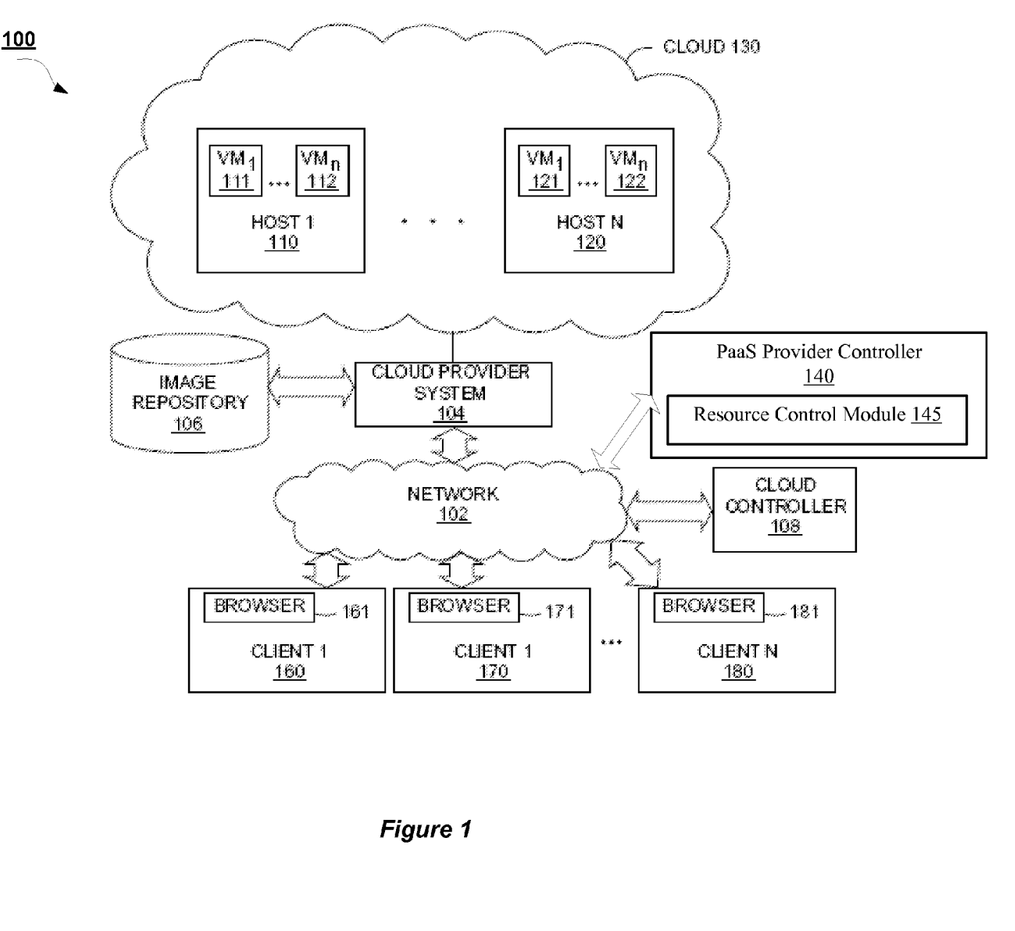
FIG. 1 is a block diagram of a network architecture in which embodiments of the invention may operate.

FIG. 1 is a block diagram of a network architecture 100 in which embodiments of the invention may operate. The network architecture 100 includes a cloud 130 managed by a cloud provider system 104. The cloud 130 provides VMs, such as VMs 111, 112, 121, and 122. Each VM is hosted on a physical machine, such as host 1 110 through host N 120, configured as part of the cloud 130. In some embodiments, the host machines 110, 120 are often located in a data center. For example, virtual machines 111 and 112 are hosted on physical machine 110 in cloud 130 provided by cloud provider 104. Users can interact with applications executing on the cloud-based VMs 112, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 130. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, 122. The command may be received from the cloud controller 108, from a PaaS Provider Controller 130, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

In one embodiment, PaaS provider controller 140 includes a resource control module 145 configured to control resources of a multi-tenant PaaS system implemented in cloud 130. The resource control module 145 may manage resources and the distribution of resources to VMs 111, 112, 121, 122 implementing the multi-tenant PaaS system. The resources are utilized by VMs 111, 112, 121, 122 to implement components of applications executed in the multi-tenant PaaS system.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
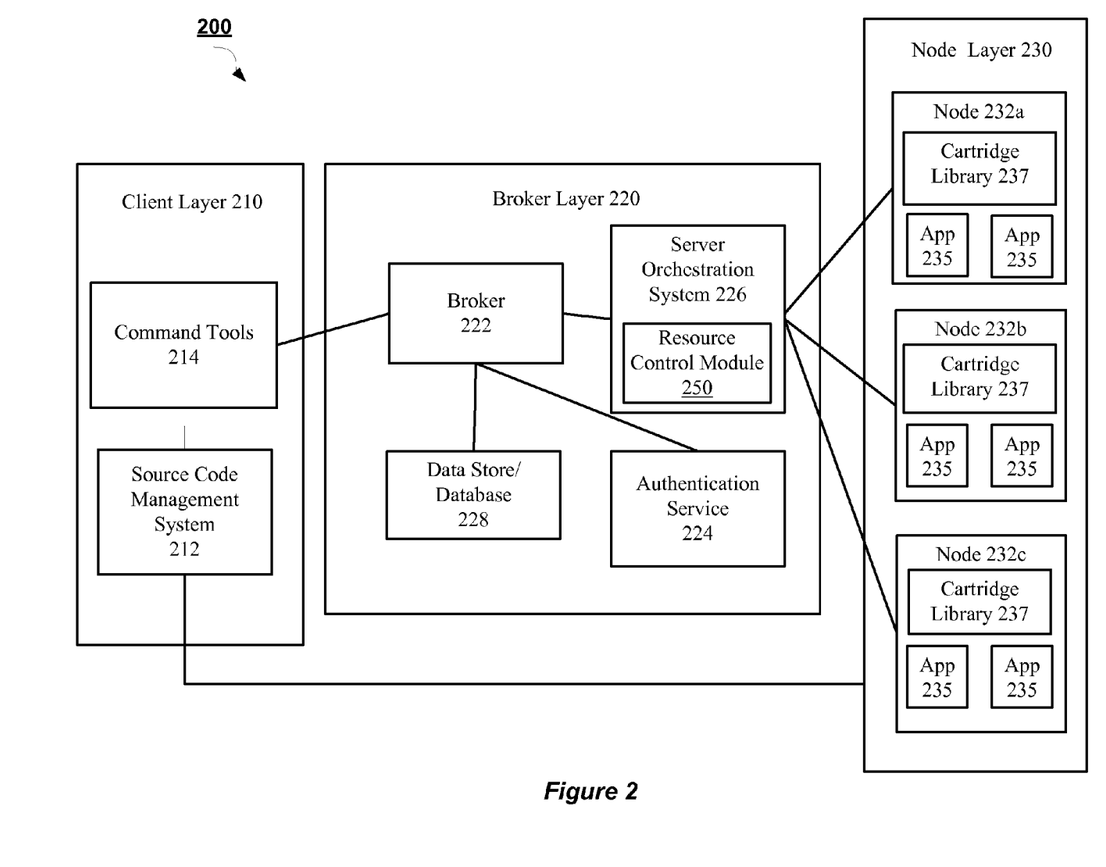
FIG. 2 is a block diagram of a PaaS system architecture according to an embodiment of the invention.

FIG. 2 is a block diagram of a PaaS system architecture 200 according to an embodiment of the invention. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232 on which software applications 235 are provisioned and executed. In one embodiment, each node 232 is a VM provisioned by an Infrastructure as a Service (IaaS) provider, such as Amazon™ Web Services. In other embodiments, the nodes 232 may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235, or some other action to manage the application 235, the broker 222 first authenticates the user using an authentication service 224. In one embodiment, the authentication service may comprise Streamline™, or may comprise some other authentication tool. Once the user has been authenticated and allowed access to the system by authentication service 224, the broker 222 uses a server orchestration system 226 to collect information and configuration information about the nodes 232.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232, which are acting as application servers and web servers.

For example, if the broker 222 wanted to shut down all applications 235 on all even numbered nodes out of 100,000 nodes, the broker 222 would only need to provide one command to the server orchestration system 226. Then, the server orchestration system 226 would generate and distribute a message to all nodes 232 to shut down all applications 235 if the node 232 is even, using a messaging and queuing system. Thus, in one embodiment, the broker 222 manages the business logic and model representing the nodes 232 and the applications 235 residing on the nodes, and acts as a controller that generates the actions requested by users via an API of the client tools 214. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally-hosted database or file store, or it can be a cloud based storage service provided by a Software-as-a-Service (SaaS) provider, such as Amazon™ S3™ (Simple Storage Service). The broker 22 uses the information about the nodes 232 and their applications 235 to model the application hosting service and to maintain records about the nodes. In one embodiment, node 232 data is stored in the form of a JavaScript Object Notation (JSON) blob or string that maintains key-value pairs to associate a unique identifier, a hostname, a list of applications, and other such attributes with the node.

In embodiments of the invention, the PaaS system architecture 200 of FIG. 2 is a multi-tenant PaaS environment. In a multi-tenant PaaS environment, each node 232 runs multiple applications 235, or portions of applications 235, that may be owned or managed by different users and/or organizations. As such, a first customer's deployed applications 235 may co-exist with any other customer's deployed applications on the same node 232 (VM) that is hosting the first customer's deployed applications 235. This deployment of multiple applications 235 of multiple customers on a single node 232 (VM) is a cost-efficient solution for PaaS providers. However, deploying a multi-tenant PaaS solution raises a variety of concerns, including, for example, efficient resource sharing on the node's 232 limited resources between the applications 235 hosted on the node 232 and security between the applications hosted on the node 232.

Embodiments of the invention provide a resource control module 250 in server orchestration system 226 for resource distribution between applications 235 hosted on a multi-tenant node 232. In one embodiment, resource control module 250 is the same as resource control module 145 described with respect to FIG. 1. The resource control module 250 manages resource distribution to applications of the multi-tenant PaaS system by setting up each node 232 to share a set of non-volatile resources that are available to any node 232 in a district of the multi-tenant PaaS system One embodiment of the interaction between the server orchestration system 226 and a node 232 to implement resource distribution for applications in districts of a multi-tenant PaaS system is now described in more detail with reference to FIG. 3.

Figure 3:
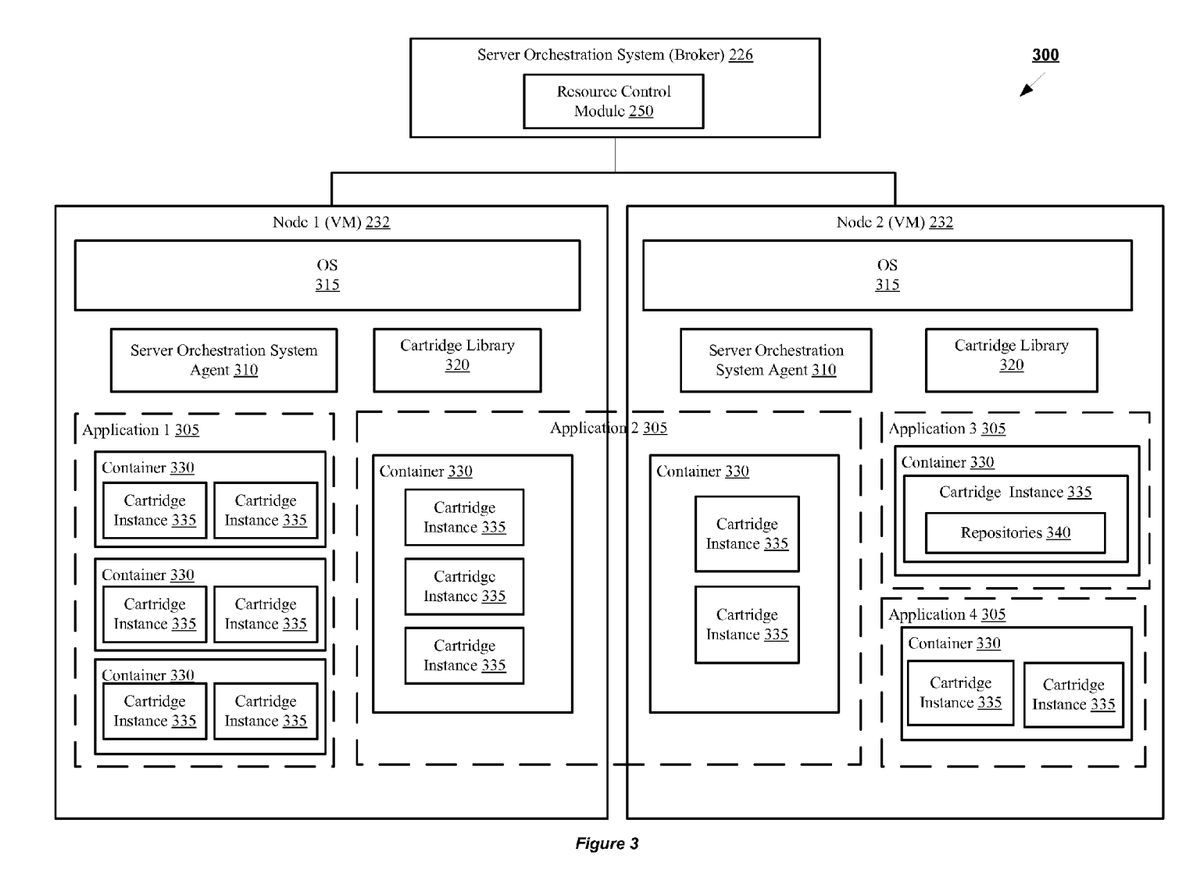
FIG. 3 is a block diagram depicting a communication infrastructure between a server orchestration system and a plurality of nodes according to embodiments of the invention.

FIG. 3 is a block diagram depicting a communication infrastructure 300 between a server orchestration system 226 and a plurality of nodes 232 according to embodiments of the invention. In one embodiment, server orchestration system 226 and nodes 232 are the same as their counterparts described with respect to FIG. 2. Each node 232 may be implemented as a VM and has an operating system 315 that can execute applications 305 using a cartridge library 320 that is resident on the node 232. In one embodiment, applications 305 are the same as applications 235 described with respect to FIG. 2.

Each node 232 also includes a server orchestration system agent 310 configured to track and collect information about the node 232 and to perform actions on the node 232. Thus, in one embodiment, using MCollective™ as the server orchestration system 226, the server orchestration system agent 310 can act as a MCollective™ server. The server orchestration system 226 would then act as the MCollective™ client that can send requests, queries, and commands to the MCollective™ server on node 232.

In one embodiment, an application 305 may utilize one or more cartridge instances 335 that are run in one or more resource-constrained containers 330 on nodes 232. A container 330 is a resource-constrained process space on the node 232 to execute functionality of an application. In some embodiments, a container 330 is established by the node 232 with resource boundaries, including a limit and/or designation of the amount of memory, amount of storage, and security types and/or labels to be applied to any functions executed by the container 330. In one embodiment, containers 330 may be established using the Linux Containers (LXC) virtualization method. In further embodiments, containers may also be established using cgroups, SELinux™, and kernel namespaces, to name a few examples.

In some embodiments, a container 330 may also be known as a gear. In some embodiments, cartridges instances 335 for an application 305 may execute in containers 330 dispersed over more than one node 232, as shown with application 2 illustrated in FIG. 3. In other embodiments, cartridge instances 335 for an application 305 may run in one or more containers 330 on the same node 232, as shown with application 1 in FIG. 3.

Cartridge library 320 provides an OS 315-based location, outside of application containers 330, that acts as a source for cartridge instantiations 335 that provide functionality (e.g., support software) for an application 305. An application 305 may use more than one cartridge instance 335 as part of providing functionality for the application 305. One example of this is a JavaEE application that uses a JBoss™ AS7 cartridge with a supporting MySQL™ database provided by a MySQL™ cartridge. Each cartridge instance may include a software repository 340 that provides the particular functionality of the cartridge instance 335. Although FIG. 3 depicts just one cartridge instance 335 with a repository 340, it should be appreciated that each cartridge instance 335 of FIG. 3 includes a repository 340, even if not shown.

In one embodiment, the server orchestration system broker 226 includes a resource control module 250 that manages resource distribution to nodes 232 in the multi-tenant PaaS system. The resource control module 350 manages placement of containers 330 executing application functionality among nodes 232. Furthermore, the resource control module 350 also controls distribution of district-level resources to be shared among nodes 232, and thereby containers 330, for purposes of executing multi-tenant application 305 on nodes 232, as discussed further below with respect to FIG. 4.

Figure 4:
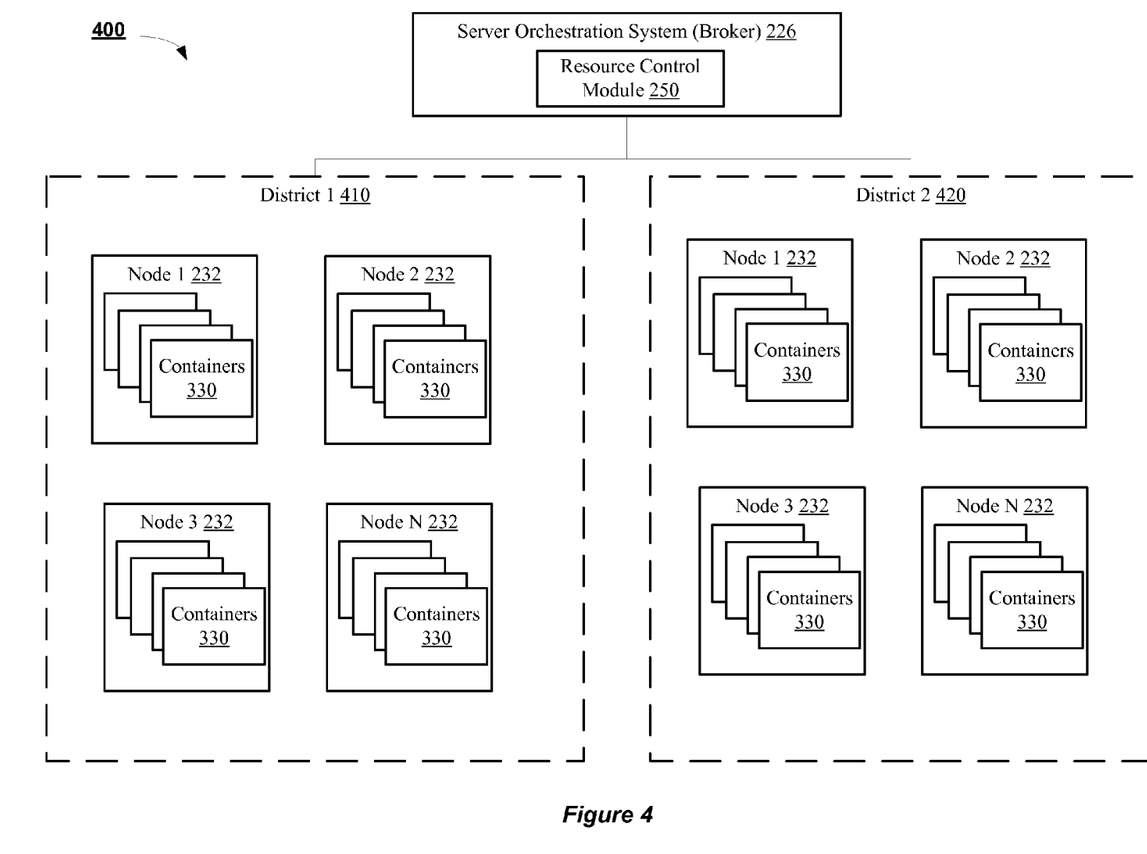
FIG. 4 is a block diagram depicting a multi-tenant PaaS system having a resource control module that implements resource distribution across districts of a multi-tenant PaaS system according to an embodiment of the invention.

FIG. 4 is a block diagram depicting a multi-tenant PaaS system 400 having a resource control module 250 at the broker layer 226 that implements resource distribution across districts of a multi-tenant PaaS system according to an embodiment of the invention. In one embodiment, the resource control module 250 is the same as resource control module 250 described with respect to FIG. 2. The resource control module 250 maintains configuration data regarding the range and distribution of non-volatile resources for each district 410, 420 in the PaaS system 400.

In one embodiment, nodes 232 of the multi-tenant PaaS system are grouped into districts 410, 420. Although only two districts 410, 420 are illustrated, one skilled in the art will appreciate that server orchestration system 226 may manage multiple (more than two) districts within a PaaS system. In one embodiment, a district 410, 420 is a collection of nodes 232 that is given a dedicated set of non-volatile resources. The non-volatile resources may include, but are not limited to, User Identifications (UIDs), Internet Protocol (IP) addresses, ports, and security labels (such as SELinux™ security labels) to share.

In embodiments of the invention, each container 330 in a district 410, 420 is then assigned unique resources from the district-level allotment of resources. As such, in embodiments of the invention no two containers 330 executing on any nodes 232 in a same district 410, 420 should conflict with each other in terms of district-level non-volatile resources, such as UIDs, IP address, ports, and/or security labels. In some embodiments, the resource control module 250 is responsible for configuring resource assignments for each container 330 in each district 410, 420.

Each district 410, 420 includes a maximum total number of containers 325 that can be provisioned in the district 410, 420. For instance, if a district 410, 420 limits a finite resource for the application that must be unique across the district, such as the numbers of ports that can be utilized, that resource, in turn, limits the total number of applications in the district. As such, in this embodiment, the district 410, 420 is limited to 6,000 containers 325 in order to avoid conflicts between containers 325 in a district 410, 420.

In addition, as mentioned previously, due to the district 410, 420 configuration of nodes 232, a container 325 migrated within a district 410, 420 does not have to change configurations of its district-assigned non-volatile resources, such as its internal UIDs, IP address(es), ports or security labeling, for example. However, if a container 325 is migrated outside of its source district 410, 420, then potential district-level resource conflicts can occur (e.g., conflicting security labels), which results in further processing for the migration.

Figure 5:
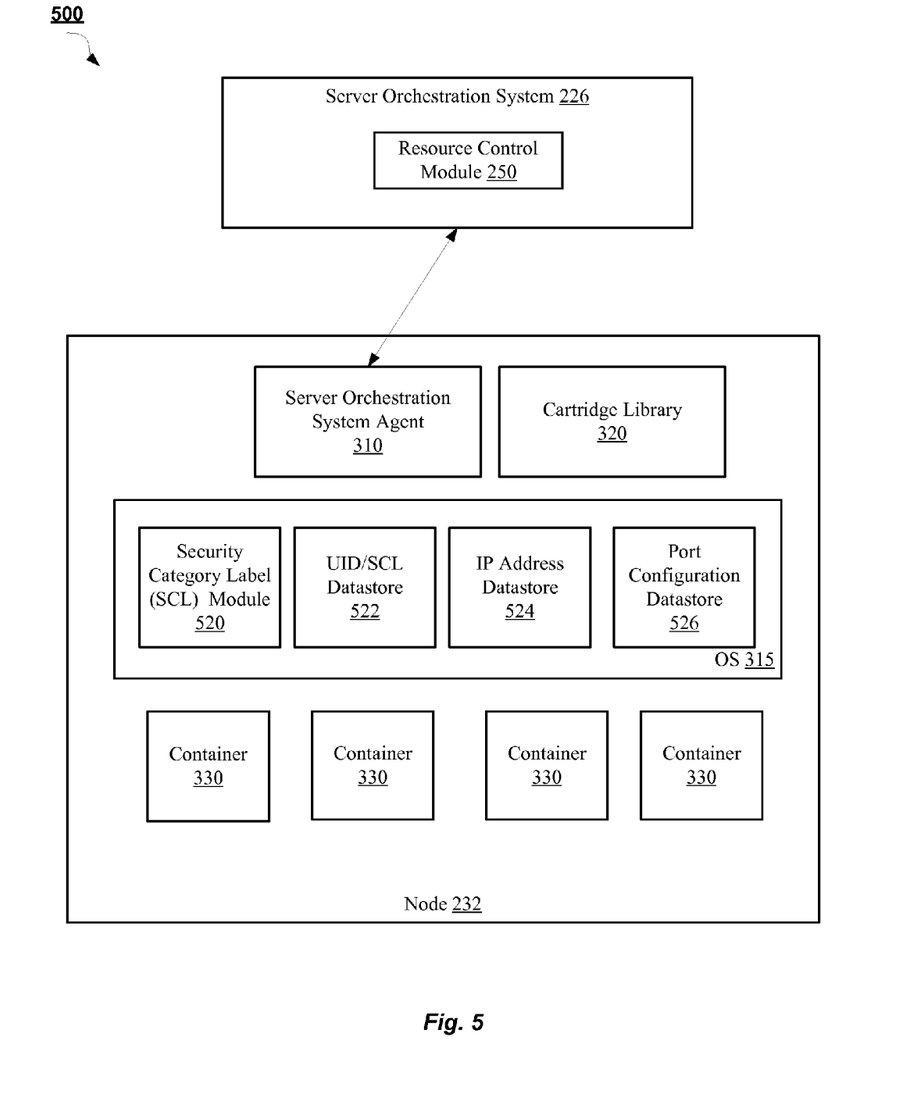
FIG. 5 is a block diagram depicting a communication infrastructure between a server orchestration system and a node according to embodiments of the invention.

FIG. 5 is a block diagram depicting a communication infrastructure 500 between a server orchestration system 225 and a node 232 according to embodiments of the invention. In one embodiment, server orchestration system 226 and node 232 are the same as their counterparts described with respect to FIG. 2. In one embodiment, node 232, which is implemented as a VM, has an operating system 315 that can execute containers 330 to implement functionality of an application using cartridges from cartridge library 320, similar to their counterpart components described with respect to FIG. 3.

In one embodiment, server orchestration system agent 310 interacts with OS 315 to manage resources for multi-tenant applications that are executed (wholly or in part) by one or more containers 330 on node 232. In one embodiment, resource control module 250 manages resources by assigning application components, such as containers 330 and their associated cartridges, to nodes 232 in the multi-tenant PaaS system in a manner that efficiently distributes processing of the application components in terms of resource and capacity utilization, as well as efficiency and responsiveness.

In one embodiment, a node 232 is assigned a range of security labels for the node 232 to assign out. The resource control module 250 provides this range of security labels to the node 232. In one embodiment, the range of security labels assigned to node 232 is a subset of a set of unique security labels allotted to a district that the node 232 is assigned. In one embodiment, a security category labeling (SCL) feature of the OS 315 is utilized to provide security and separation for each container executed on the node 232 from all other containers 330 executed in the district of the node. An SCL is a security enhancement to an OS, such as OS 315, that allows users to label files with categories. These categories may then be used to constrain the file and any processes that are trying to access the file.

In one embodiment, a security category labeling is implemented using a Multi-Category Security (MCS) feature of SELinux™. SELinux™ is a security architecture integrated into the Linux™ OS kernel. SELinux provides a flexible Mandatory Access Control (MAC) system built into the Linux™ kernel. MCS is an enhancement to SELinux™ and allows users to label files with categories. Other security category labeling features from other OS vendors may also be utilized in embodiments of the invention as well.

In one embodiment, a SCL module 520 of OS 315 generates unique SCLs to be assigned to applications 305 of node 232 based on unique local user IDs (UID) maintained by OS 315. OS 315 maintains a set of unique local UIDs that are assigned to containers 330 as they are installed on the node 232. In one embodiment, the set of unique local UIDs are part of a larger set of unique UIDs used in a district of the node 232. In one embodiment, SCL module 520 generates a set of unique SCLs by applying a transform to each unique local UID maintained by OS 315. In order to maintain a unique set of SCLs for a district, the transform that is applied by SCL module 520 should be uniformly used by all nodes 232 in a district. In one embodiment, the generation of an SCL for each unique local UID of the node 232 is performed prior to any containers 330 being initialized on the node 232.

The mapping of local UID to SCL may be stored in UID/SCL datastore 522 of OS 315. In one embodiment, node 232 maintains a range of local UIDs (e.g., from 500 to 1500) provided to node 232 by the resource control module 250, where the local UIDs are a subset of a larger unique set of UIDs for a district of nodes 232. The node 232 assigns one of the local UIDs to containers 330 as they are created on node 232. Prior to any containers 330 starting on node 232, SCL module 520 assigns a unique SCL to each UID in the range. In some embodiments, a transform is applied to each local UID to generate the SCL for that UID. For example, UID #500 is turned into SCL S0:C0, C1, and UID #501 is turned into SCL S0:C0, C2, UID #502 is turned into SCL S0:C0, C3, and so on.

In a further embodiment, after the unique SCLs are generated and mapped to their associated local UIDs by SCL module 520, resource control module 250 may interact with server orchestration system agent 310 to pre-configure Internet Protocol (IP) addresses and ports assigned to the node 232. As part of the initial configuration of node 232, the node 232 is assigned a set of IP addresses and ports to be utilized by processes (e.g., containers 330) of the node 232. For example, a whole class A set of IP addresses may be utilized by node 232, which potentially results in the order of 16 million IP addresses assigned to node 232. Similarly, a large range of ports may also be assigned to the node for customized use by a container 330 (e.g., ephemeral or custom ports) of the node 232. In one embodiment, this set of IP addresses and ports is part of a larger range of IP addresses and ports that are unique across all nodes 232 in a district. In other words, each node 232 in a district is not assigned the same range of IP addresses or the same range of ports as any other node 232 in the same district.

Node 232 may then associate subsets of the assigned IP addresses and ports of the node 232 to each local UID maintained by the node. In one embodiment, each local UID is assigned a class C network of IP addresses from the class A set of IP addresses, which results in around 250 IP addresses. In addition, each local UID may be assigned a number of ephemeral or custom ports (e.g., 5) from the ports assigned to the node 232. IP address datastore 524 and port configuration data store 526 may be used by OS 315 to keep a record of the existing IP addresses and ports for the node 232, as well as a mapping between IP addresses/UIDs and ports/UIDs.

In one embodiment, SCL module 520 then accesses IP address datastore 524 and port configuration data store 526 to pre-label IP addresses and ports with SCLs. SCL module 520 may utilize the UID/SCL datastore 522 to match SCLs associated with a UID to the IP addresses and ports for the same UID found in IP address datastore 524 and in the port configuration datastore 526. In one embodiment, each of the IP address datastore 524 and the port configuration datastore keep a record of the SCL label applied to each IP address and to each port. In some embodiments, pre-configuring the IP addresses and ports with SCLs associated with the UID assigned to the IP addresses and ports prior to initialization of container 330 on the node 232 can save time in the configuration process of the container 330 itself. In other embodiments, the IP addresses and ports may be associated with SCLs of the container 330 when the container 330 is initialized on the node 232.

In some embodiments, when a container 330 is initialized on node 232, it is assigned a unique local UID, as discussed above. Then, in one embodiment, SCL module 520 accesses the home directory of the container 330 and assigns the unique SCL to all resources found in the home directory. In one embodiment, a change context (CHCON) command may be used to change labels on the files listed in the home directory associated with the UID (i.e., associated with the application 305). When the container 330 begins running on node 232, SCL module 520 associates the unique SCL associated with the local UID of the application 305 to the running process of the application 305 so that the process is run with the SCL. Once the application 305 is running, the IP addresses associated with the local UID of the application 305 may then be utilized (as they were already pre-configured to be associated with the UID) and will already have the associated SCLs assigned.

Utilizing the unique SCL assigned to the combination of the running process of the application 305, the files of the application 305, and the IP addresses and ports of the container 330, the SCL module 520 may then enforce permissions to access these resources of container 330. The SCL label is used by SCL module 520 to keep containers 330 separated from each other, both on the node 232 and within the district of the node 232. For example, SCL module 520 ensures that the SCL of a requesting process matches the SCL of any resources (e.g., files and/or IP addresses) that it is requesting to access. If the SCLs do not match, the SCL module 520 denies permission to the requesting process. In some embodiments, each SCL provides a same level of security for each container 330, but prevents container 330 from accesses resources of other container 330.

One skilled in the art will appreciate that non-volatile resources other than UIDs, security labels, IP addresses, and ports may be uniquely assigned to nodes 232 in a district, and thereby to the containers 330 executed in the nodes 232. Embodiments of the invention are not solely limited to the above described non-volatile resources.

Figure 6:
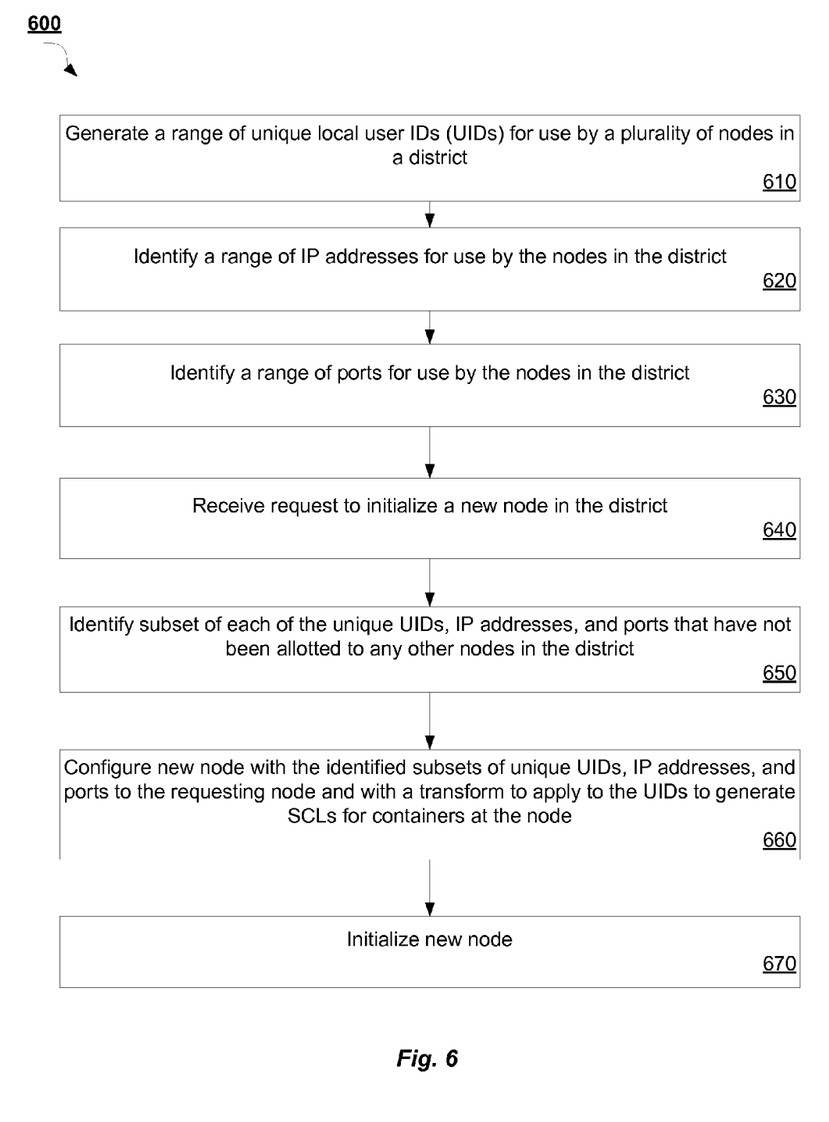
FIG. 6 is a flow diagram illustrating a method for configuring a node of a district with unique district-level resources for execution of multi-tenant applications in a PaaS environment of a cloud computing system according to an embodiment of the invention.

FIG. 6 is a flow diagram illustrating a method 600 for configuring a node of a district with unique district-level resources for execution of multi-tenant applications in a PaaS environment of a cloud computing system according to an embodiment of the invention. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by a resource control module executing on a computing device, such as resource control module 250 described with respect to FIGS. 2 through 5.

Method 600 begins at block 610 where a range of unique UIDs are generated for use by a plurality of nodes in a district of the multi-tenant PaaS system. In one embodiment, a district of the multi-tenant PaaS system is a collection of nodes of the PaaS system that are associated for purposes of resource allotment. At block 620, a range of IP addressed for use by the nodes in the district is identified. At block 630, a range of ports for use by the nodes in the district is also identified. In some embodiments, the resource control module may associate the UIDs to IP addresses and ports, while in other embodiments the node may handle this association process.

Then, at block 640, a request to initialize a new node in the district is received. In one embodiment, the request is received from a component of the server orchestration system operating on a broker layer of the multi-tenant PaaS system. The new node may be requested to address capacity and utilization concerns of the multi-tenant PaaS system. At block 650, a subset of each of the ranges of unique UIDs, IP addresses, and port for the district that have not been allotted to any nodes in the district are identified.

At block 660, the new node for the district is configured with the identified subsets of unique UIDs, IP addresses, and ports for the node. Furthermore, the new node is configured with a transform for the node to apply to the UIDs when generating SCLs for containers executed by the node. This uniform transform among nodes of a district results in a unique range of SCLs generated for a district, without any overlapping of SCLs in the district. Lastly, at block 670, the new node is initialized in the district with the district-level resource configurations for its non-volatile resources.

Figure 7:
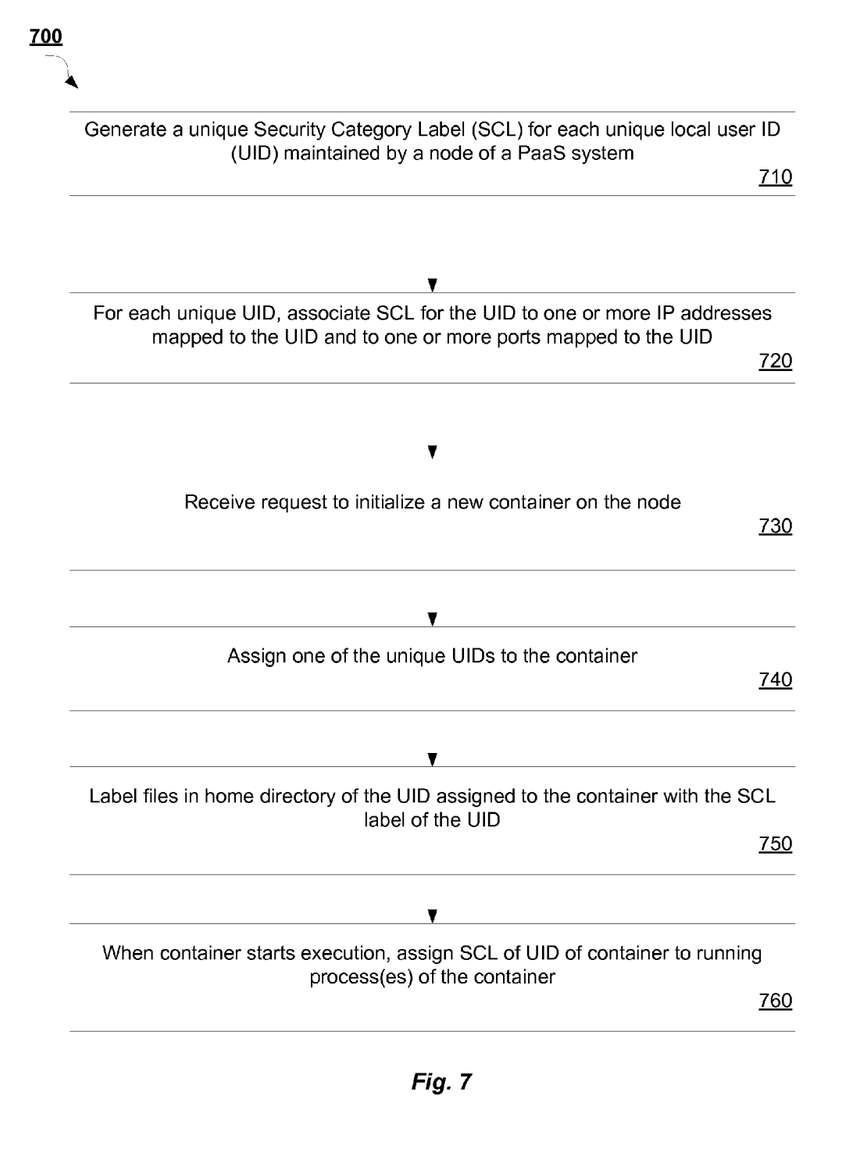
FIG. 7 is a flow diagram illustrating a method for applying unique district-level resources to a container executing in a node of a multi-tenant PaaS system in a cloud computing environment according to an embodiment of the invention.

FIG. 7 is a flow diagram illustrating a method 700 for applying unique district-level resources to a container executing in a node of a multi-tenant PaaS system in a cloud computing environment according to an embodiment of the invention. Method 700 may be performed by processing logic that may comprise hardware (e.g., circuitry, dedicated logic, programmable logic, microcode, etc.), software (such as instructions run on a processing device), firmware, or a combination thereof. In one embodiment, method 700 is performed by a node executing on a computing device, such as node 232 described with respect to FIGS. 2 through 5.

Method 700 begins at block 710 where a range of unique SCLs are generated for each unique local UID maintained by the node of the PaaS system. The unique local UID may be provided by a resource control module of the multi-tenant PaaS system as one of a range of UIDs allotted for a district of the node. In one embodiment, a transform is applied to each local UID to generate the unique SCL for that UID. This transform may be the same transform that is applied by all nodes in the district of the node. A mapping between UIDs and SCLs may then be maintained by a datastore in the OS.

At block 720, for each unique UID, the SCL for that UID is associated with one or more IP addresses mapped to the UID and to one or more ports mapped to the UID. In one embodiment, the IP addresses and ports are provided to the node as subsets of a larger set of IP addresses and ports used within the district of the node. A mapping of IP addresses to UIDs may be utilized to match SCLs to IP addresses. This mapping of IP addresses to SCLs may then be maintained in an IP address datastore of the OS of the node. Similarly, a mapping of ports to UIDs may be utilized to match SCLs to ports. This mapping of ports to SCLS may then be maintained in a port configuration datastore of the OS of the node.

Then, at block 730, a request to initialize a container on the node is received. In one embodiment, the request is received from a server orchestration system operating on a broker layer of the PaaS system. The container is a resource-constrained space of the node that is used to execute functionality (e.g., cartridges) of a multi-tenant application of the PaaS system. In some embodiments, an application's functionality may be spread amongst multiple containers and districts in the multi-tenant PaaS system, with different application containers co-existing on a same node in the multi-tenant PaaS system.

Subsequently, at block 740, a unique local UID of the local UIDs maintained by the node is assigned to the container. At block 750, files of the container found in a home directory of the UID of the container are labeled with the SCL of the UID. Then, at block 760, when the container starts running, the SCL of the UID of the container is assigned to the running process of the container. In one embodiment, a SCL module of the OS, such as SCL module 520 of FIG. 5, may coordinate method 700 on the node.

Figure 8:
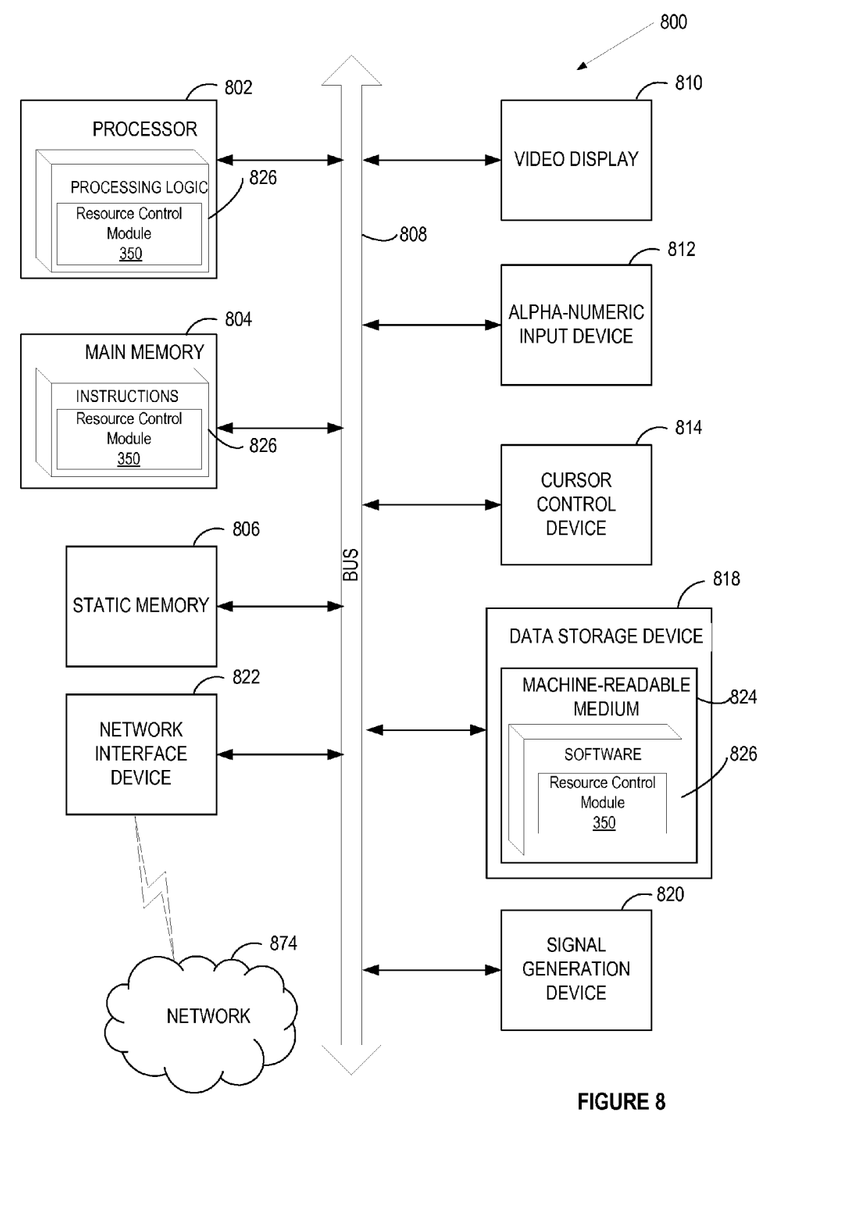
FIG. 8 illustrates a block diagram of one embodiment of a computer system.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein, illustrated in FIG. 8 by depicting instructions 826 within processor 802.

The computer system 800 may further include a network interface device 822. The computer system 800 also may include a video display unit 810 (e.g., a liquid crystal display (LCD), a cathode ray tube (CRT), or a touchscreen), an alphanumeric input device 812 (e.g., a keyboard), a cursor control device 814 (e.g., a mouse), and a signal generation device 820 (e.g., a speaker).

The data storage device 818 may include a machine-readable storage medium 824 (also known as a computer-readable storage medium) on which is stored software 826 (e.g., one or more sets of instructions, software, etc.) embodying any one or more of the methodologies or functions described herein. The software 826 may also reside, completely or at least partially, within the main memory 804 (e.g., instructions 826) and/or within the processor 802 (e.g., processing logic 826) during execution thereof by the computer system 800, the main memory 804 and the processor 802 also constituting machine-readable storage media. The software 826 may further be transmitted or received over a network 874 via the network interface device 822.

In one embodiment, the software 826 include instructions for a resource control module 850, which may correspond to resource control module 250 of FIGS. 2 through 5, and/or a software library containing methods that call the resource control module for application partitioning in a multi-tenant PaaS environment in a cloud computing system. While the machine-readable storage medium 824 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
receiving, by a virtual machine (VM) executed by a processing device, a request to initialize a container on the VM, the container comprising a resource-constrained space of the VM to execute functionality of an application of a multi-tenant Platform-as-a-Service (PaaS) system;
assigning, by the VM, a user identification (UID) to the container, wherein the UID is part of a subset of UIDs allotted to the VM from a range of UIDs associated with a district of the VM, and wherein other VMs in the district are not allotted the same subset of UIDs from the range of UIDs;
assigning, by the VM, non-volatile resources to the container, the assigned non-volatile resources associated with the UID of the container and part of a subset of non-volatile resources allotted to the VM from a range of non-volatile resources used by the district, wherein other VMs in the district are not allotted the same subset of non-volatile resources from the range of non-volatile resources; and
executing, by the VM, functionality of a first application of the multi-tenant PaaS in the container, wherein the VM comprises other containers executing functionality of other applications having different owners than the application.

2. The method of claim 1, further comprising:
generating a security category label (SCL) for the UID of the container;
assigning the generated SCL to Internet Protocol (IP) addresses mapped to the UID of the container;
assigning the generated SCL to ports mapped to the UID of the container;
assigning the SCL to files of the container; and
assigning the SCL to a running process of the container.

3. The method of claim 2, wherein the SCLs are Multi-Category Security (MCS) labels of a SELinux™ operating system (OS).

4. The method of claim 3, wherein every VM that is part of the district uses the transform.

5. The method of claim 2, wherein the generating the SCL for the UID comprising applying a transform to the UID to create the SCL for the UID.

6. The method of claim 2, further comprising:
receiving, from a requesting process, a request to access a resource, wherein the resource comprises at least one of: the files of the container, the IP addresses mapped to the UID of the container, or the ports mapped to the UID of the container;
determining an SCL assigned to a container of the requesting process;
determining an SCL assigned to requested resource; and
when the SCL of the container of the requesting process matches the SCL assigned to the requested resource, allowing the requesting process to access the requested resource.

7. The method of claim 6, wherein when the SCL of the container of the requesting process does not match the SCL assigned to the requested resource, denying access to the requested resource by the requesting process.

8. The method of claim 1, wherein a resource control module of a server orchestration system of the multi-tenant PaaS system is to:
manage the range of UIDs associated with the district and the range of non-volatile resources associated with the district;
allot the subset of UIDs to the VM; and
allot the subset of non-volatile resources to the VM.

9. A system, comprising:
a memory;
a processing device communicably coupled to the memory; and
a virtual machine (VM) to virtualize resources of the memory and the processing device, wherein the VM to:
receive a request to initialize a container on the VM, the container comprising a resource-constrained space of the VM to execute functionality of an application of a multi-tenant Platform-as-a-Service (PaaS) system;
assign a user identification (UID) to the container, wherein the UID is part of a subset of UIDs allotted to the VM from a range of UIDs associated with a district of the VM, and wherein other VMs in the district are not allotted the same subset of UIDs from the range of UIDs;
assign non-volatile resources to the container, the assigned non-volatile resources associated with the UID of the container and part of a subset of non-volatile resources allotted to the VM from a range of non-volatile resources used by the district, wherein the VMs in the district are not allotted the same subset of non-volatile resources from the range of non-volatile resources; and
execute functionality of a first application of the multi-tenant PaaS in the container, wherein the VM comprises other containers executing functionality of other applications having different owners than the application.

10. The system of claim 9, wherein the VM to generate a security category label (SCL) for the UID of the container further comprises the VM to:
assign the generated SCL to Internet Protocol (IP) addresses mapped to the UID of the container;
assign the generated SCL to ports mapped to the UID of the container;
assign the SCL to files of the container; and
assign the SCL to a running process of the container.

11. The system of claim 10, wherein the SCLs are Multi-Category Security (MCS) labels of a SELinux™ operating system (OS).

12. The system of claim 10, wherein the VM to generate the SCL for the UID further comprises the VM to apply a transform to the UID to create the SCL for the UID, and wherein every VM that is a member of the district uses the transform.

13. The system of claim 9, wherein the VM is further to:
receive, from a requesting process, a request to access a resource, wherein the resource comprises at least one of: the files of the container, the IP addresses mapped to the UID of the container, or the ports mapped to the UID of the container;
determine an SCL assigned to a container of the requesting process;
determine an SCL assigned to requested resource; and
when the SCL of the container of the requesting process matches the SCL assigned to the requested resource, allow the requesting process to access the requested resource.

14. The system of claim 13, wherein when the SCL of the container of the requesting process does not match the SCL assigned to the requested resource, the VM is further to deny access to the requested resource by the requesting process.

15. The system of claim 9, wherein a resource control module of a server orchestration system of the multi-tenant PaaS system is to:
manage the range of UIDs associated with the district and the range of non-volatile resources associated with the district;
allot the subset of UIDs to the VM; and
allot the subset of non-volatile resources to the VM.

16. A non-transitory machine-readable storage medium including instructions that, when accessed by a processing device, cause the processing device to:
receive, by a virtual machine (VM) executed by the processing device, a request to initialize a container on the VM, the container comprising a resource-constrained space of the VM to execute functionality of an application of a multi-tenant Platform-as-a-Service (PaaS) system;
assign, by the VM, a user identification (UID) to the container, wherein the UID is part of a subset of UIDs allotted to the VM from a range of UIDs associated with a district of the VM, and wherein other VMs in the district are not allotted the same subset of UIDs from the range of UIDs;
assign, by the VM, non-volatile resources to the container, the assigned non-volatile resources associated with the UID of the container and part of a subset of non-volatile resources allotted to the VM from a range of non-volatile resources used by the district, wherein other VMs in the district are not allotted the same subset of non-volatile resources from the range of non-volatile resources; and
execute, by the VM, functionality of a first application of the multi-tenant PaaS in the container, wherein the VM comprises other containers executing functionality of other applications having different owners than the application.

17. The non-transitory machine-readable storage medium of claim 16, wherein the processing device is further to:
generate a security category label (SCL) for the UID of the container;
assign the generated SCL to Internet Protocol (IP) addresses mapped to the UID of the container;
assign the generated SCL to ports mapped to the UID of the container;
assign the SCL to files of the container; and
assign the SCL to a running process of the container.

18. The non-transitory machine-readable storage medium of claim 17, wherein the processing device to generate the SCL for the UID further comprises the processing device to apply a transform to the UID to create the SCL for the UID, wherein every VM that is part of the district uses the transform.

19. The non-transitory machine-readable storage medium of claim 17, wherein the processing device is further to:
receive, from a requesting process, a request to access a resource, wherein the resource comprises at least one of: the files of the container, the IP addresses mapped to the UID of the container, or the ports mapped to the UID of the container;
determine an SCL assigned to a container of the requesting process;
determine an SCL assigned to requested resource; and
when the SCL of the container of the requesting process matches the SCL assigned to the requested resource, allow the requesting process to access the requested resource; and
when the SCL of the container of the requesting process does not match the SCL assigned to the requested resource, deny access to the requested resource by the requesting process.

20. The non-transitory machine-readable storage medium of claim 16, wherein a resource control module of a server orchestration system of the multi-tenant PaaS system is to:
manage the range of UIDs associated with the district and the range of non-volatile resources associated with the district;
allot the subset of UIDs to the VM; and
allot the subset of non-volatile resources to the VM.

* * * * *